(12) United States Patent
Vaninetti et al.

(10) Patent No.: US 11,933,463 B2
(45) Date of Patent: Mar. 19, 2024

(54) LIGHT BOX

(71) Applicant: GOODRICH CORPORATION, Charlotte, NC (US)

(72) Inventors: Travis J. Vaninetti, Bothell, WA (US); Shawn A. Claflin, Issaquah, WA (US)

(73) Assignee: GOODRICH CORPORATION, Charlotte, NC (US)

( * ) Notice: Subject to any disclaimer, the term of this patent is extended or adjusted under 35 U.S.C. 154(b) by 82 days.

(21) Appl. No.: 17/836,937

(22) Filed: Jun. 9, 2022

(65) Prior Publication Data
US 2023/0400159 A1    Dec. 14, 2023

(51) Int. Cl.
*G02F 1/1335* (2006.01)
*F21K 9/68* (2016.01)
*F21K 9/69* (2016.01)
*F21Y 115/10* (2016.01)

(52) U.S. Cl.
CPC .................. *F21K 9/68* (2016.08); *F21K 9/69* (2016.08); *F21Y 2115/10* (2016.08)

(58) Field of Classification Search
CPC .......... F21K 9/68; F21K 9/69; F21Y 2115/10; G02B 27/0006; G09G 3/20; H04N 23/57
See application file for complete search history.

(56) References Cited

U.S. PATENT DOCUMENTS

| | | | |
|---|---|---|---|
| 3,240,114 A * | 3/1966 | Jonker | G06K 17/00 250/221 |
| 9,354,385 B2 | 5/2016 | An et al. | |
| 9,709,245 B2 | 7/2017 | Di Trapani et al. | |
| 10,151,449 B2 | 12/2018 | Takeshita | |
| 2014/0182177 A1* | 7/2014 | Wang | G09F 13/0413 40/564 |
| 2018/0098399 A1 | 4/2018 | Takeshita et al. | |

FOREIGN PATENT DOCUMENTS

| | | | |
|---|---|---|---|
| DE | 3120835 A * | 12/1982 | G10H 1/32 |
| WO | 2019063753 | 4/2019 | |

OTHER PUBLICATIONS

European Patent Office, European Search Report dated Oct. 17, 2023 in Application No. 23178081.8.

* cited by examiner

*Primary Examiner* — Elmito Breval
(74) *Attorney, Agent, or Firm* — SNELL & WILMER L.L.P.

(57) ABSTRACT

A lightbox is disclosed herein, comprising a lower panel, a back panel connected to the lower panel and extending upward from the lower panel, wherein the back panel is coated in a reflective material, an inner lens connected to the lower panel and extending upward from the lower panel, the inner lens being adjacent the back panel, a first cavity at least partially defined by the back panel and the inner lens, an outer lens connected to the lower panel and extending upward from the lower panel, the outer lens being adjacent the inner lens and opposite the back panel, and a first LED adjacent the lower panel and oriented to emit a light away from the lower panel and into the first cavity.

20 Claims, 5 Drawing Sheets

LIGHT BOX

FIELD

The present disclosure generally relates aircraft lavatories, and more specifically, to lighting in aircraft lavatories.

BACKGROUND

Aircraft lavatories are generally confined spaces that may be claustrophobic to some people. While some aircraft solve this problem by including a window in the lavatory which provides some relief, many aircraft are not able to provide a window in the lavatory. Not having a window or an external reference point induces a feeling that the lavatory space is smaller than it is.

SUMMARY

A lightbox is disclosed herein, comprising a lower panel, a back panel connected to the lower panel and extending upward from the lower panel, wherein the back panel is coated in a reflective material, an inner lens connected to the lower panel and extending upward from the lower panel, the inner lens being adjacent the back panel, a first cavity at least partially defined by the back panel and the inner lens, an outer lens connected to the lower panel and extending upward from the lower panel, the outer lens being adjacent the inner lens and opposite the back panel, and a first LED adjacent the lower panel and oriented to emit a light away from the lower panel and into the first cavity.

In various embodiments, the first LED further comprises a first LED strip and a second LED strip, the first LED strip and the second LED strip being parallel. In various embodiments, the lightbox further includes an upper panel connected to a second end of the back panel, wherein the lower panel is connected to a first end of the back panel, the first end being opposite the second end and a second LED disposed at the second end of the back panel and oriented to emit light away from the upper panel and into the first cavity. In various embodiments, the back panel has a first radius of curvature between the lower panel and the upper panel, the inner lens has a second radius of curvature the same as the first radius of curvature, and the outer lens has a third radius of curvature the same as the second radius of curvature.

In various embodiments, the back panel includes a first section near the lower panel, the first section having a first curve and a second section opposite the lower panel, the second section having a second curve, the second curve being having a radius of curvature greater than the radius of curvature of the first curve. In various embodiments, the back panel extends upward from the lower panel at a first angle of about 50° to about 110°. In various embodiments, the inner lens extends upward from the lower panel at a second angle, the second angle being different than the first angle. In various embodiments, the outer lens extends upward from the lower panel at a third angle, the third angle being different than at least one of the first angle and the second angle. In various embodiments, a surface of the inner lens facing the back panel includes a second reflective coating that is different than the reflective coating of the back panel. In various embodiments, the second reflective coating allows a first amount of the light in the first cavity to pass through the inner lens and into second cavity between the inner lens and the outer lens, the first amount of the emitted light being about 5% to about 15%. In various embodiments, the inner lens includes a Fresnel lens.

Also disclosed herein is a lightbox. The lightbox includes an upper panel, a lower panel, a back panel extending between the upper panel and the lower panel, a reflective coating at least partially covering the back panel, an inner lens extending between the upper panel and the lower panel, the inner lens being adjacent the back panel, an outer lens extending between the upper panel and the lower panel, the outer lens being adjacent the inner lens, the inner lens disposed between the outer lens and the back panel, a first light emitting diode (LED) mounted adjacent the lower panel and configured to emit light away from the lower panel and into a first cavity at least partially defined by the back panel and the inner lens, and a second LED mounted adjacent the upper panel and configured to emit light away from the upper panel and into the first cavity.

In various embodiments, the lightbox further includes a surface of the inner lens, the surface facing the back panel and a second reflective coating covering the surface. In various embodiments, the inner lens further includes a Fresnel lens that directs light from the first cavity to the into a second cavity that is at least partially defined by the inner lens and the outer lens. In various embodiments, the second reflective coating permits about 1% to about 25% of light in the first cavity to pass through the inner lens and into the second cavity. In various embodiments, the outer lens projects light from the second cavity away from the lightbox, the outer lens further diffusing the light. In various embodiments, the back panel includes a first curved section and a second curved section, the first curved section having a first arc, and the second curved section having a second arc that is greater than the first arc.

In various embodiments, the back panel extends upward from the lower panel at a first angle, the first angle being about 60° to about 90°. In various embodiments, the inner lens extends upward from the lower panel at a second angle, the second angle being the same as the first angle. In various embodiments, the outer lens extends upward from the lower panel at a third angle, the third angle being the same as the first angle and the second angle.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is a lightbox using a novel design and material stack-up that creates the illusion of a window that projects light into the lavatory from a passenger-perceived far away distance. The lightbox uses a material stack-up that reflects, diffuses, and/or projects light into the aircraft lavatory as well as casts shadows analogous to natural sunlight. In various embodiments, light emitting diode (LED) strips are placed along the bottom inside surface and top inside surface of the lightbox. The back walls, or back surface, of the light box is coated in a highly reflective material. In various embodiments, the reflective material is usually white. In various embodiments, a diffuse film spreads the light reflective off the back walls and spreads the light out, diffusing the light. In various embodiments, the diffused light then passes through one or more lenses that project the light into the lavatory. For example, one lens may be a Fresnel lens and another lens may be a polycarbonate lens. This configuration and combination of materials provides the illusion of a window and a light source that is further away from the aircraft lavatory than the back of the light box. The use of the lightbox may minimize the discomfort felt by passengers the confined space of the aircraft lavatory.

In addition to the lightbox, in various embodiments, providing the illusion of a light in the distance, the lightbox may be customized to project different color lights. For example, the lightbox may be configured to display colors similar to a sunset or sunrise at the appropriate time of day. As another example, the light box may be configured to display colors similar to a clear blue sky at mid-day or a foggy day light. In various embodiments, different combinations of colors and scenes are available. Furthermore, the lightbox is not limited to a specific shape. Using the novel material stack-up, the light box may be straight back or curved. In fact, the light box may have any radius of curvature so that it fits against the inside of the fuselage of an aircraft, such as in the aircraft lavatory. It should therefore be apparent that the lightbox described herein is not limited to use in an aircraft lavatory but may be used in many different contexts and locations.

Figure 1:
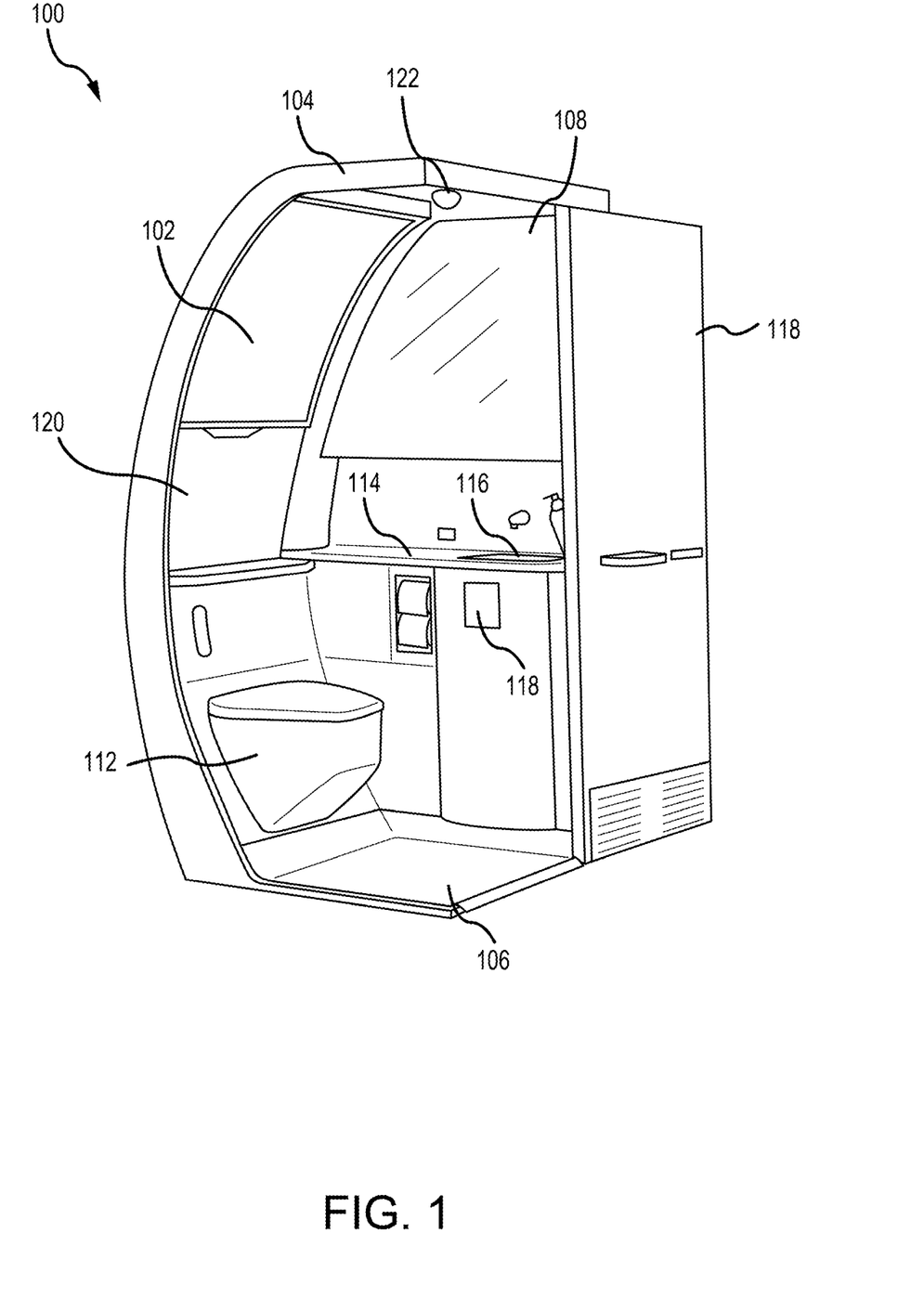
FIG. 1 illustrates an aircraft lavatory including a light box, in accordance with various embodiments.

Referring now to FIG. 1, in accordance with various embodiments, an aircraft lavatory 100 is illustrated. Aircraft lavatory 100 includes lightbox 102, ceiling 104, floor 106, mirror 108, door 110, toilet 112, counter 114, sink 116, and trash bin 118. Aircraft lavatory 100 is spaced constrained and a confined space. While mirror 108 may provide make the confined space of aircraft lavatory 100 appear larger, it is still confined and may be uncomfortable to passengers. Lightbox 102 is disposed on a back wall 120 of aircraft lavatory 100. Back wall 120 is generally curved, matching the curvature of the fuselage of the aircraft or the curvature of the interior linings of the aircraft, among other reasons for being curved. Accordingly, the curvature of lightbox 102 is designed to match the curvature of back wall 120.

Lightbox 102 may be activated, or turned on, at the same time as a light 122 on ceiling 104 of aircraft lavatory 100. In various embodiments, this may occur when door 124 is closed and/or latched. In various embodiments, this may occur when a switch is flipped, or a button is pressed. In various embodiments, lightbox 102 may be activated, or turned on, separately from light 122, providing control of lightbox 102 to a passenger, or occupant of aircraft lavatory 100. In each case lightbox 102 provides additional lighting inside aircraft lavatory 100. Additionally, lightbox 102 provides the illusion of light entering aircraft lavatory 100 from a distance further away than back wall 120. The illusion of light being projected into aircraft lavatory 100 by lightbox 102 is created by the unique and novel material stack-up.

Figure 2A:
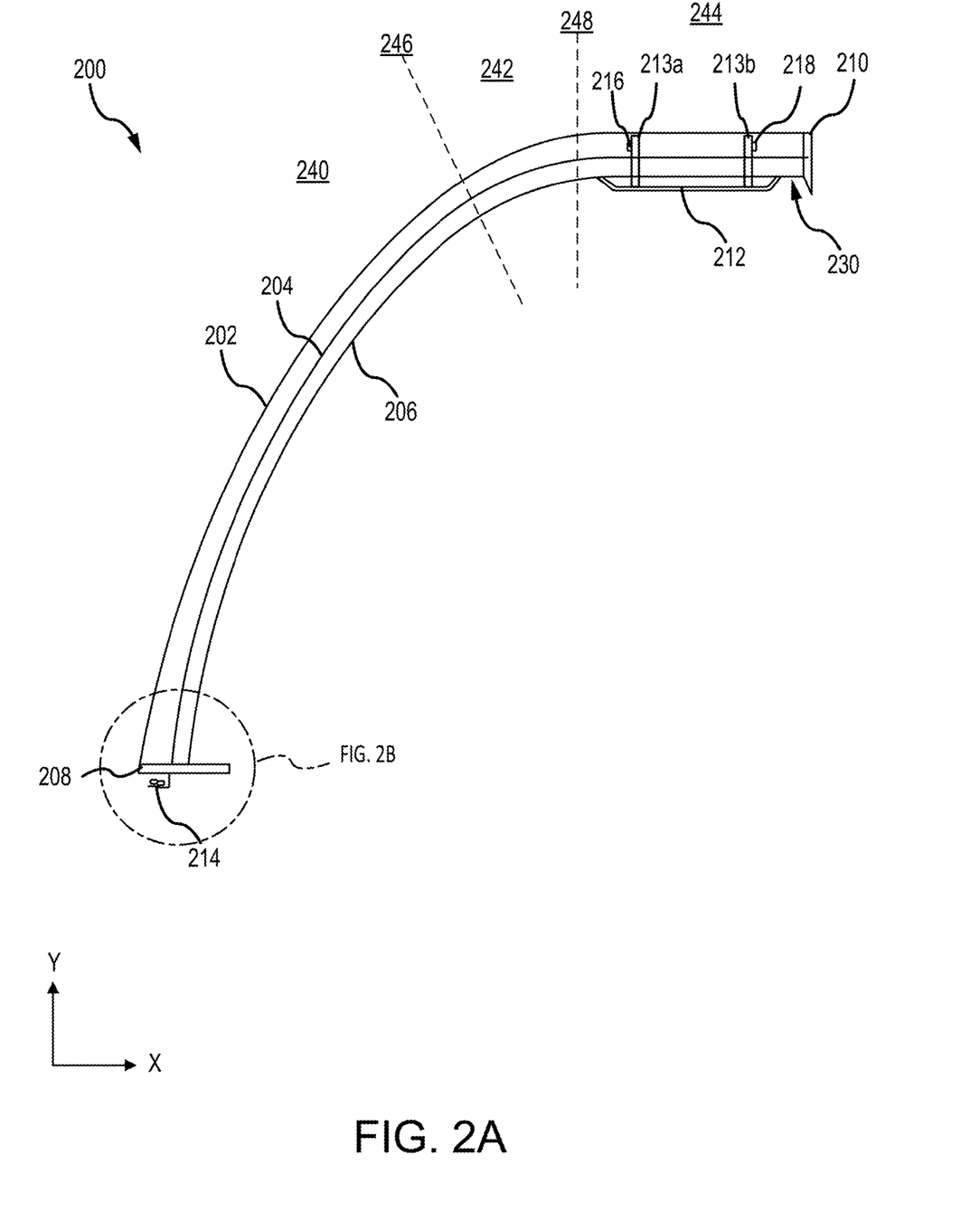
FIGS. 2A and 2B illustrate cross-section views of a light box, in accordance with various embodiments.
Figure 2B:
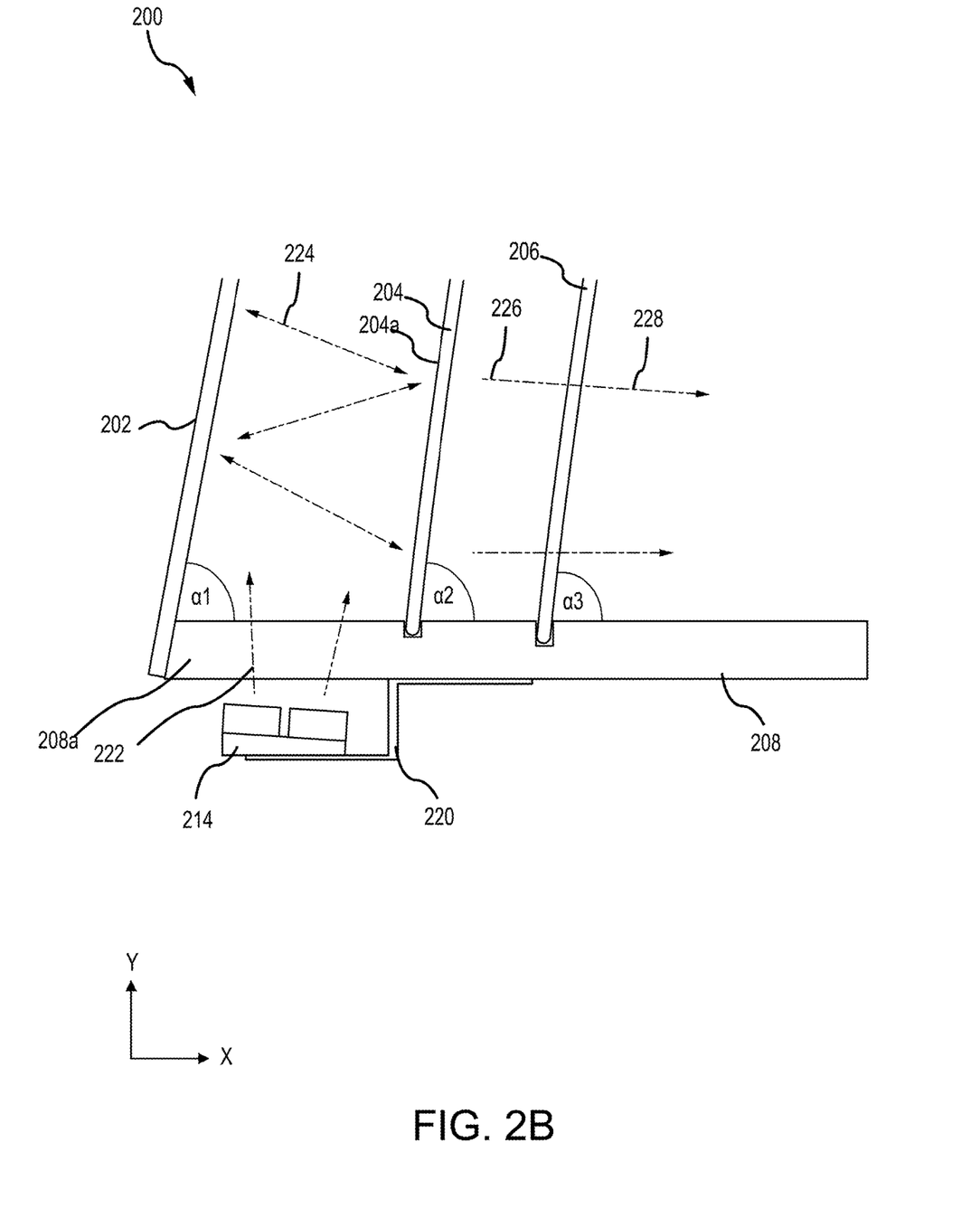

Referring now to FIGS. 2A and 2B, in accordance with various embodiments, a cross-section view of a lightbox 200 is illustrated. Lightbox 200 may be an example of lightbox 102 described above with respect to FIG. 1. As illustrated, lightbox 200 is designed to be curved to match the curvature of the surface on which lightbox 200 is to be mounted, such as for example, back wall 120 of aircraft lavatory 100. Lightbox 200 includes a back panel 202, an inner lens 204, an outer lens 206, a lower panel 208, an upper panel 210, and a ceiling panel 212. Back panel 202, inner lens 204, and outer lens 206 are curved to match the curvature of the surface on which it is to be mounted. Ceiling panel 212 is mounted to back panel 202 by mounts 213a and 213b.

A first light emitting diode (LED) 214 is mounted within lightbox 200 and near lower panel 208. In various embodiments, LED 214 may be mounted below lower panel 208 suing a mount 220. A second LED 216 is mounted to mount 213a above ceiling panel 212 and between back panel 202 and inner lens 204. A third LED 218 is mounted to mount 213b above ceiling panel 212 and between back panel 202 and inner lens 204. First LED 214 is configured to emit light upward (e.g., the y-direction) between back panel 202 and inner lens 204, as indicated by arrows 222 in FIG. 2B. Second LED 216 is configured to emit light backward (e.g., the negative x-direction) and toward first LED 214. Third LED 218 is configured to emit light forward (e.g., the x-direction) and toward upper panel 210.

In various embodiments, first LED 214, second LED 216, and/or third LED 218 may comprise one or more LEDs and/or strips of LEDs. Including multiple LEDs, as shown in FIG. 2B with first LED 214, allows the light to blend between the LEDs and improves the appearance of the light emitted by lightbox 200. For example, multiple LEDs provides softer colors and more nuanced color. In various embodiments, first LED 214, second LED 216, and/or third LED 218 may comprise a white LED, a colored LED, and/or a combination of white and colored LEDs. Including multiple LEDs in first LED 214, second LED 216, and/or third LED 218 increases the brightness of lightbox 200. Including multiple colors (e.g., RGB LEDs) in first LED 214, second LED 216, and/or third LED 218 increases the number of colors available for display. This provides the ability to customize the appearance of the light emitted from lightbox 200 to mimic a sunrise, a sunset, a clear blue sky, and/or a foggy day.

Back panel 202 is a reflective surface that is designed to reflect the light emitted by first LED 214 (e.g., arrows 222) as shown by arrows 224. In various embodiments, back panel 202 may be a solid white panel. In various embodiments, the solid back panel 202 may be a color other than white to adjust an amount of reflection off back panel 202 and/or a color displayed by lightbox 200. In various embodiments, back panel 202 may be an opaque panel or white or another reflective color. In various embodiments, back panel 202 may be coated with a reflective film such as, for example, a reflective film used in LCD TVs and computer monitors. Regardless of the material and/or the color used for back panel 202, back panel 202 reflects light being emitted by first LED 214, second LED 216, and third LED 218.

Inner lens 204, disposed between back panel 202 and outer lens 206, reflects light (e.g., arrows 224) toward back panel 202 while allowing a small percentage of light through (e.g., arrows 226). This distributes the light more evenly through inner lens 204, and ultimately projects the light through outer lens 206. In various embodiments, inner lens 204 may be a Fresnel lens that focuses the received light (e.g., arrows 224) toward outer lens (e.g., arrows 226) and ultimately out lightbox 200. Furthermore, this improves diffusion of light around a curved surface, such as illustrated in FIG. 2A, which is more difficult to achieve than with a straight (e.g., flat) surface. In various embodiments, a film may be placed on a backside surface 204a of inner lens 204 that reflects most of the light toward back panel 202 and diffuses a small percentage light as it is directed toward outer lens 206. In various embodiment, the percentage of light allow through inner lens 204 is about 1% to about 25%, and more specifically, about 5% to about 15%. This helps create the illusion that the light leaving lightbox 200 is further away than back wall 120 of aircraft lavatory 100. A first cavity is defined at least partially by inner lens 204 and back panel 202.

Outer lens 206 further distributes, diffuses, and projects the light (e.g., arrows 226) out of lightbox 200 and into the space in which lightbox 200 is placed (e.g., aircraft lavatory 100). That is, outer lens 206 spreads the reflected light (e.g., arrows 224) and emitted light (e.g., arrows 222) softening the edges of the light to make the light appear as if it is generated in the distance. The diffused light exiting lightbox 200 is represented by arrows 228. In various embodiments, outer lens 206 may be a frosted lens made from glass or acrylic. Such a frosted lens provides good light diffusion and distribution. In various embodiments, outer lens 206 may be Solite, or small pebble, lens that removes striations in the light and softens the edges of the light. In various embodiments, outer lens 206 may be a prismatic, or large pebble or general spread, lens that provides a pronounced widening effect. A prismatic lens may create a larger beam and soften the edges of the beam. Each of these embodiments may be made from acrylic or glass, among other materials. A second cavity is defined at least partially by outer lens 206 and inner lens 204.

Lower panel 208 provides support for back panel 202, inner lens 204, and outer lens 206 as well as supporting first LED 214. In various embodiments, lower panel 208 may be solid or opaque. In various embodiment, lower panel 208 may be clear. Lower panel 208 includes a portion 208a above (e.g., the y-direction) the first LED 214 that allows light from first LED 214 to pass into the cavity between back panel 202 and inner lens 204. There is an angle α1 between lower panel 208 and back panel 202, an angle α2 between lower panel 208 and inner lens 204, and an angle α3 between lower panel 208 and outer lens 206. In various embodiments, angles α1, α2, and α3 may all be similar, that is within about +/−5° of each other. In various embodiments, angles α1, α2, and/or α3 may be different. Angle α1 may be about 40° to about 110°, and more specifically, about 60° to about 90°. Angle α2 may be about 40° to about 110°, and more specifically, about 60° to about 90°. Angle α3 may be about 40° to about 110°, and more specifically, about 60° to about 90°.

Upper panel 210 provides support for back panel 202, inner lens 204, and outer lens 206 and an enclosure for lightbox 200. In various embodiment, upper panel 210 may be coupled to a wall, such as in aircraft lavatory 100. In various embodiments, upper panel 210 may not be touching another surface. In various embodiments, upper panel 210 may be solid and blocking light from passing through. In various embodiments, upper panel 210 may be frosted or otherwise allow at least some light to pass through.

Ceiling panel 212 blocks light from passing through into the space in which lightbox 200 is placed. For example, ceiling panel 212 may be placed over sink 116 of aircraft lavatory 100. In various embodiments, a light may be mounted to ceiling panel 212, such as, for example, light 122. In various embodiments, such as lightbox 102 in FIG. 1, ceiling panel 212 is omitted. In such embodiments, second LED 216 and/or third LED 218 may be mounted to upper panel 210. In various embodiments, lightbox 200 may further include an opening 230 between ceiling panel 212 and upper panel 210. Opening 230 allows light emitted by third LED 218 to be projected out of lightbox 200 and into the room (e.g., aircraft lavatory 100).

Lightbox 200 extends from lower panel 208 to upper panel 210 and may be viewed as including a section 240 and a section 242, and a section 244 where section 240 and section 242 are separated by line 246 and section 242 and section 244 are separated by line 248. While sections 240, 242, 244 are not physically different, they are useful for describing the shape of lightbox 200. For example, section 240 extends from lower panel 208 to line 246, section 242 extends from line 246 to line 248, and section 244 extends from line 248 to upper panel 210. Section 240, as previously noted, is angled with respect to lower panel 208. Furthermore, section 240 has a first curve and section 242 has a second curve. The first curve may be referred to as a gentle curve relative to the second curve, meaning that the arc of the first curve is greater than the arc of the second curve. Similarly, the second curve may be referred to as a sharp curve relative to the first curve, meaning that the arc of the second curve is less than the arc of the first curve. Or in other words, the radius of curvature of the second curve is less than the radius of curvature of the first curve. Within section 240, each of back panel 202, inner lens 204, and outer lens 206 may have a similar radius of curvature. That is, the radius of curvature of each of back panel 202, inner lens, and outer lens 206 may be within about 0° to about 10° of each other, and more specifically within about 3° to about 5° of each other. Within section 242, each of back panel 202, inner lens 204, and outer lens 206 may have a similar radius of curvature. That is, the radius of curvature of each of back panel 202, inner lens, and outer lens 206 may be within about 0° to about 10° of each other, and more specifically within about 3° to about 5° of each other. Section 244 may be referred to as being horizontal (e.g., in the x-axis). That is, lightbox 200 may be shaped to conform a curvature of back wall 120 of aircraft lavatory 100. In various embodiments, lightbox 200 may be shaped to conform to a curvature of any surface upon which it is mounted.

Figure 3:
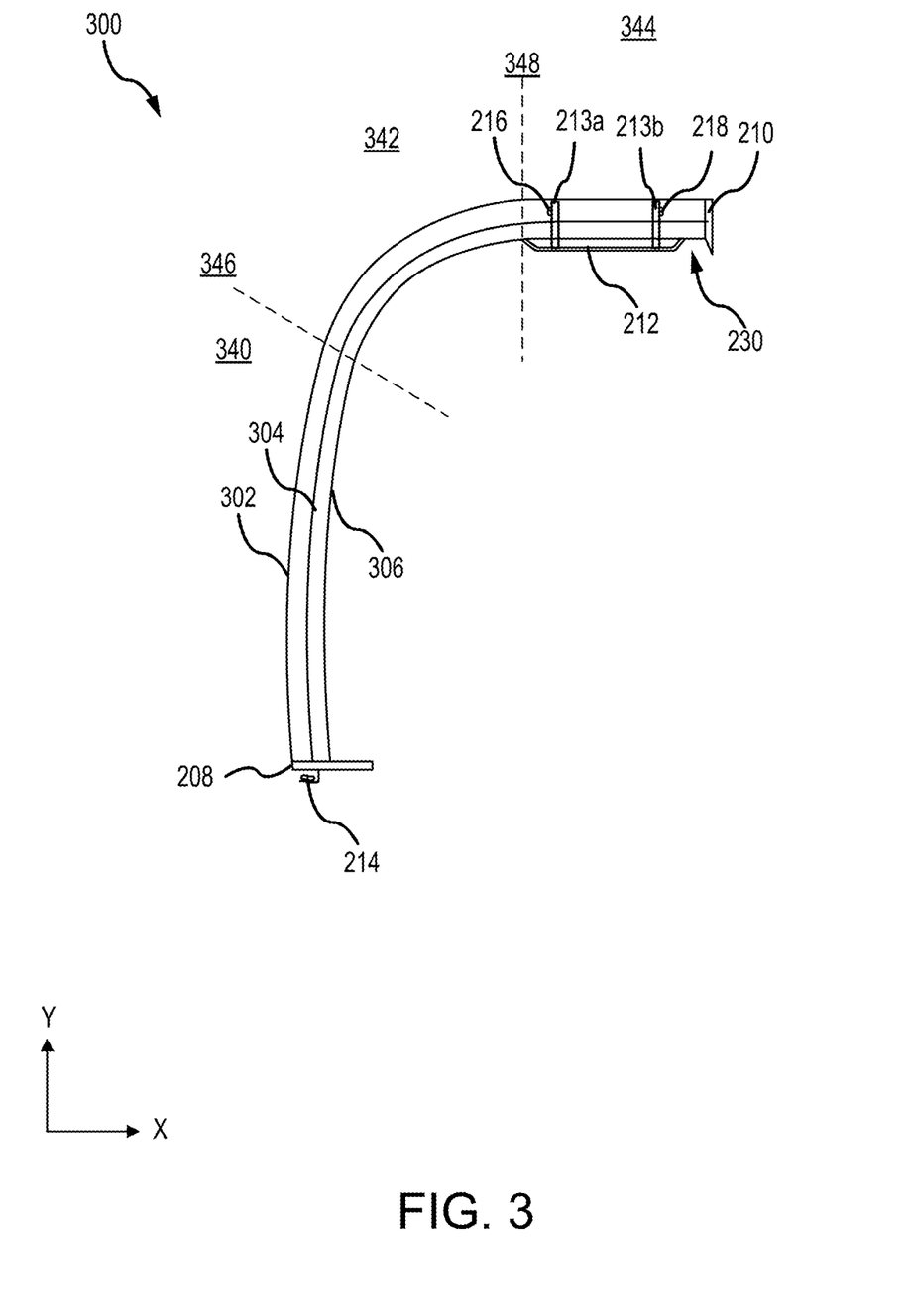
FIG. 3 illustrates a cross-section view of a light box, in accordance with various embodiments.

Referring now to FIG. 3, in accordance with various embodiments, a cross section of a lightbox 300 is illustrated. Lightbox 300 includes similar components to those described above with respect to lightbox 200 in FIGS. 2A and 2B including lower panel 208, upper panel 210, ceiling panel 212, mounts 213a, 213b, first LED 214, second LED 216, third LED 218, and opening 230. These components are similar in lightbox 300 and their description therefore may not be repeated below. Lightbox 300 further includes back panel 302, inner lens 304, and outer lens 306. Back panel 302, inner lens 304, and outer lens 306 are similar in function and form to back panel 202, inner lens 204, and outer lens 206, respectively, described above with respect to FIGS. 2A and 2B. Similar aspects of each may not be repeated below.

Lightbox 300 extends from lower panel 208 to upper panel 210 and may be viewed as including a section 340 and a section 342, and a section 344 where section 340 and section 342 are separated by line 346 and section 342 and section 344 are separated by line 348. While sections 340, 342, 344 are not physically different, they are useful for describing the shape of lightbox 300. For example, section 340 extends from lower panel 208 to line 346, section 342 extends from line 346 to line 348, and section 344 extends from line 348 to upper panel 210. Section 340, as previously noted, is angled with respect to lower panel 208. Furthermore, section 340 has a first curve and section 342 has a second curve. The first curve may be referred to as a gentle curve relative to the second curve, meaning that the arc of the first curve is greater than the arc of the second curve. In other words, the radius of curvature of the first curve is greater than the radius of curvature of the second curve. In fact, section 340 extends orthogonally from lower panel 208 and is almost vertical (e.g., the y-axis) with a large arc. Similarly, the second curve may be referred to as a sharp curve relative to the first curve, meaning that the arc of the second curve is less than the arc of the first curve. In other words, the radius of curvature of the second curve is less than the radius of curvature of the first curve. Within section 340, each of back panel 202, inner lens 204, and outer lens 206 may have a similar radius of curvature. That is, the radius of curvature of each of back panel 202, inner lens, and outer lens 206 may be within about 0° to about 10° of each other, and more specifically within about 3° to about 5° of each other. Within section 342, each of back panel 202, inner lens 204, and outer lens 206 may have a similar radius of curvature. That is, the radius of curvature of each of back panel 202, inner lens, and outer lens 206 may be within about 0° to about 10° of each other, and more specifically within about 3° to about 5° of each other. Section 244 may be referred to as being horizontal (e.g., in the x-axis).

Figure 4:
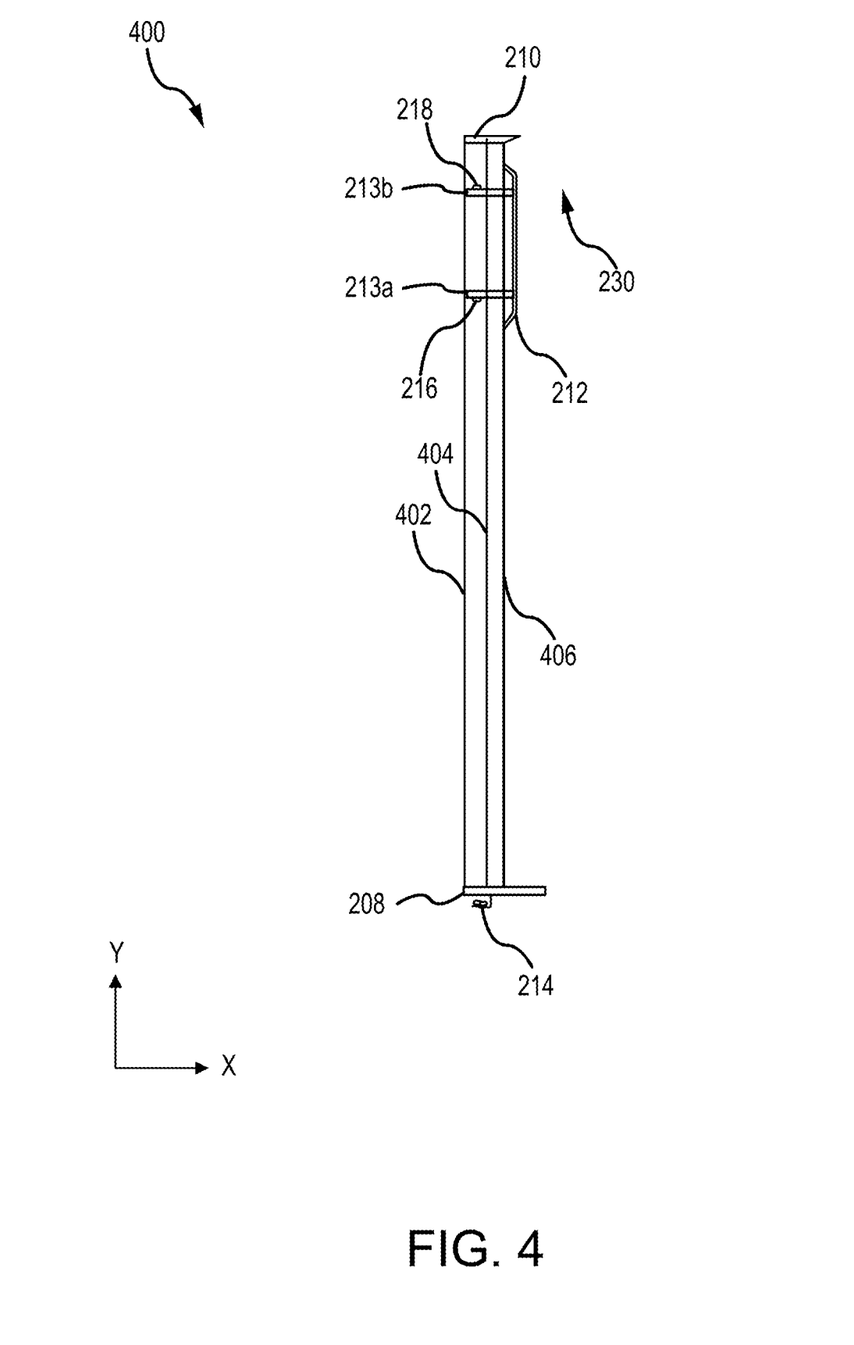
FIG. 4 illustrates a cross-section view of a light box, in accordance with various embodiments.

Referring now to FIG. 4, in accordance with various embodiments, a cross section of a lightbox 400 is illustrated. Lightbox 400 includes similar components to those described above with respect to lightbox 200 in FIGS. 2A and 2B including lower panel 208, upper panel 210, ceiling panel 212, mounts 213a, 213b, first LED 214, second LED 216, third LED 218, and opening 230. These components are similar in lightbox 400 and their description therefore may not be repeated below. Lightbox 400 further includes back panel 402, inner lens 404, and outer lens 406. Back panel 402, inner lens 404, and outer lens 406 are similar in function and form to back panel 202, inner lens 204, and outer lens 206, respectively, described above with respect to FIGS. 2A and 2B. Similar aspects of each may not be repeated below.

Back panel 402, inner lens 404, and outer lens 406 are orthogonal to lower panel 208, extending vertically (e.g., the y-axis) upward from lower panel 208. In various embodiments, ceiling panel 212 may be removed with second LED 216 and/or third LED 218 mounted to upper panel 210. As shown in the previous descriptions and various embodiments, lightbox 102 (e.g., lightbox 200, lightbox 300, and lightbox 400) may be manufactured to fit many spaces, providing function and decoration for many different uses than those described herein.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A lightbox, comprising:
   a lower panel;
   a back panel connected to the lower panel and extending upward from the lower panel, wherein the back panel is coated in a reflective material;
   an inner lens connected to the lower panel and extending upward from the lower panel, the inner lens being adjacent the back panel;
   a first cavity at least partially defined by the back panel and the inner lens;
   an outer lens connected to the lower panel and extending upward from the lower panel, the outer lens being adjacent the inner lens and opposite the back panel; and
   a first LED adjacent the lower panel and oriented to emit a light away from the lower panel and into the first cavity.

2. The lightbox of claim 1, wherein the first LED further comprises:
   a first LED strip; and
   a second LED strip, the first LED strip and the second LED strip being parallel.

3. The lightbox of claim 1, further comprising:
   an upper panel connected to a second end of the back panel, wherein the lower panel is connected to a first end of the back panel, the first end being opposite the second end; and
   a second LED disposed at the second end of the back panel and oriented to emit light away from the upper panel and into the first cavity.

4. The lightbox of claim 3, wherein the back panel has a first radius of curvature between the lower panel and the upper panel, the inner lens has a second radius of curvature the same as the first radius of curvature, and the outer lens has a third radius of curvature the same as the second radius of curvature.

5. The lightbox of claim 1, wherein the back panel comprises:
   a first section near the lower panel, the first section having a first curve; and
   a second section opposite the lower panel, the second section having a second curve, the second curve being having a radius of curvature greater than the radius of curvature of the first curve.

6. The lightbox of claim 1, wherein the back panel extends upward from the lower panel at a first angle of about 50° to about 110°.

7. The lightbox of claim 6, wherein the inner lens extends upward from the lower panel at a second angle, the second angle being different than the first angle.

8. The lightbox of claim 7, wherein the outer lens extends upward from the lower panel at a third angle, the third angle being different than at least one of the first angle and the second angle.

9. The lightbox of claim 1, wherein a surface of the inner lens facing the back panel includes a second reflective coating that is different than the reflective coating of the back panel.

10. The lightbox of claim 9, wherein the second reflective coating allows a first amount of the light in the first cavity to pass through the inner lens and into second cavity between the inner lens and the outer lens, the first amount of the emitted light being about 5% to about 15%.

11. The lightbox of claim 1, wherein the inner lens includes a Fresnel lens.

12. The lightbox of claim 11, wherein the back panel includes a first curved section and a second curved section, the first curved section having a first arc, and the second curved section having a second arc that is greater than the first arc.

13. The lightbox of claim 12, wherein the back panel extends upward from the lower panel at a first angle, the first angle being about 60° to about 90°.

14. The lightbox of claim 13, wherein the inner lens extends upward from the lower panel at a second angle, the second angle being the same as the first angle.

15. The lightbox of claim 14, wherein the outer lens extends upward from the lower panel at a third angle, the third angle being the same as the first angle and the second angle.

16. A lightbox, comprising:
    an upper panel;
    a lower panel;
    a back panel extending between the upper panel and the lower panel;
    a reflective coating at least partially covering the back panel;
    an inner lens extending between the upper panel and the lower panel, the inner lens being adjacent the back panel;
    an outer lens extending between the upper panel and the lower panel, the outer lens being adjacent the inner lens, the inner lens disposed between the outer lens and the back panel;
    a first light emitting diode (LED) mounted adjacent the lower panel and configured to emit light away from the lower panel and into a first cavity at least partially defined by the back panel and the inner lens; and
    a second LED mounted adjacent the upper panel and configured to emit light away from the upper panel and into the first cavity.

17. The lightbox of claim 16, further comprising;
    a surface of the inner lens, the surface facing the back panel; and
    a second reflective coating covering the surface.

18. The lightbox of claim 17, wherein the inner lens further includes a Fresnel lens that directs light from the first cavity to the into a second cavity that is at least partially defined by the inner lens and the outer lens.

19. The lightbox of claim 18, wherein the second reflective coating permits about 1% to about 25% of light in the first cavity to pass through the inner lens and into the second cavity.

20. The lightbox of claim 19, wherein the outer lens projects light from the second cavity away from the lightbox, the outer lens further diffusing the light.

\* \* \* \* \*